(12) United States Patent
Moscovich et al.

(10) Patent No.: US 11,192,355 B2
(45) Date of Patent: Dec. 7, 2021

(54) PRINTING CALIBRATION (71) Applicant: HP SCITEX LTD., Netanya (IL)

(72) Inventors: Sharon Moscovich, Netanya (IL); Ori Rotenberg, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 16/376,093

(22) Filed: Apr. 5, 2019

(65) Prior Publication Data

US 2019/0315119 A1 Oct. 17, 2019

(30) Foreign Application Priority Data

Apr. 12, 2018 (EP) .................................... 18167114

(51) Int. Cl.
*B41J 29/38* (2006.01)
*B41J 2/045* (2006.01)

(52) U.S. Cl.
CPC ....... *B41J 2/04505* (2013.01); *B41J 2/04586* (2013.01)

(58) Field of Classification Search
None
See application file for complete search history.

(56) References Cited

U.S. PATENT DOCUMENTS

| | | | |
|---|---|---|---|
| 5,056,430 A * | 10/1991 | Bayerlein | ............... B41F 13/12 101/181 |
| 5,329,381 A | 7/1994 | Payne | |
| 6,575,095 B1 * | 6/2003 | Mahy | .................... H04N 1/6033 101/485 |
| 8,909,120 B2 | 12/2014 | Akita | |
| 9,245,200 B2 | 1/2016 | Magri | |
| 2005/0012930 A1 * | 1/2005 | Steinfield | ............. H04N 1/6055 356/425 |
| 2006/0133866 A1 | 6/2006 | Asakura | |
| 2008/0304891 A1 | 12/2008 | Saijo | |
| 2009/0231369 A1 * | 9/2009 | Iwao | ...................... B41J 2/2114 347/8 |
| 2013/0021398 A1 | 1/2013 | Mizes | |
| 2014/0139583 A1 | 5/2014 | Kammerzell | |
| 2014/0161359 A1 | 6/2014 | Magri | |
| 2015/0174934 A1 | 6/2015 | Bogart | |

(Continued)

FOREIGN PATENT DOCUMENTS

| | | |
|---|---|---|
| CN | 102439962 A | 5/2012 |
| CN | 107635781 A | 1/2018 |
| JP | 2007190800 A | 8/2007 |

(Continued)

*Primary Examiner* — Erica S Lin
*Assistant Examiner* — Tracey M McMillion
(74) *Attorney, Agent, or Firm* — Brooks Cameron & Huebsch PLLC (57) ABSTRACT

In an example, a print target may be printed with a calibration target. The calibration target may comprise a first printing fluid figure printed on the print target and a second printing fluid figure printed on the print target. A geometric figure may be defined by the second printing fluid figure. The geometric figure may be negatively outlined in the second printing fluid figure. In an example, the calibration target may be processed to define a geometric relationship between a first printing fluid reference point and a second printing fluid reference point.

7 Claims, 5 Drawing Sheets

(56) References Cited

U.S. PATENT DOCUMENTS

2017/0244869 A1* 8/2017 Uroz Soria ........ H04N 1/00023
2017/0246856 A1 8/2017 Stoeckle

FOREIGN PATENT DOCUMENTS

| JP | 2012006191 A | | 1/2012 |
| --- | --- | --- | --- |
| JP | 2012035446 A | | 2/2012 |
| JP | 3185373 U | * | 8/2013 |

* cited by examiner

PRINTING CALIBRATION

BACKGROUND

Certain printing operations involve the use of a fixative that acts to fix printing fluid pigment or dye that is printed on a print target. In some cases, the printing system will provide a fixative layer that is intended to align with an image printed in ink. The fixative layer fixes the printed image to the print target. The fixative layer may also prevent printing fluid pigment or dye loss into the print target. An example system using a fixative layer are the presses used in printing packaging materials.

In certain examples, a set of nozzles may be used to deliver the printing fluid to the print target and thereby define the printed image. Another set of nozzles may be used to deliver the fixative layer onto the same target.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

A printing process may involve depositing a printing fluid on a print target to define or reproduce an image on a print target. In certain examples, the printing fluid may be a vehicle that acts to deliver a pigment or dye to the print target to form an image thereon. For example, the printing fluid may be an ink carrying a pigment or dye that is applied to, and may penetrate, the surface of the print target to form an image on the print target.

The printing process may involve depositing a second printing fluid on the print target. In certain examples, the second printing fluid may be a fixative. As used herein, a 'fixative' refers to a composition, which, when deposited on a print target, is capable of receiving a printing fluid and holding pigments or dyes in the printing fluid to a greater degree than a print target not treated with fixative. A fixative, as used herein, is capable of holding pigments or dyes in the printing fluid at or near the surface of a print target so that the visual appearance of a printed image on the print target can be improved compared to a print target that is not treated with the fixative. A fixative solution may be used to deliver the fixative to the print target.

The printing process may have a first printing fluid printing system. In certain examples, the first printing fluid printing system may be an ink printing system. The printing process may have a second printing fluid printing system. In certain examples, the second printing fluid printing system may be a fixative printing system.

The first printing fluid printing system and the second printing fluid printing system may each have a set of printing dies that deliver the first printing fluid and the second printing fluid to the print target. In certain examples, the fixative printing system and the ink printing system may each have a set of printing dies that deliver the fixative and the ink to the print target. In certain examples, the printing system may print the fixative onto the print target and then print the ink onto the print target.

Accurate aligning of the first printing fluid and the second printing fluid may promote a reliable printing process. For example, accurate aligning of the fixative and ink printing systems promotes a uniform and accurate image on the print target. In certain examples, the fixative dies and the ink dies may be aligned to produce an image on the print target.

The printing dies that deliver the first printing fluid and the second printing fluid to the print target may comprise CMOS chips. In certain examples, the fixative dies and ink dies may comprise CMOS chips. The CMOS chips may deliver fixative or ink to the print target through print nozzles. In certain examples, the first printing fluid printing system may be an ink printing system that may comprise CMOS dies using the CMYK (cyan, yellow, magenta, black) colour model. In certain examples, each CMOS die provides two colours, for example, a CK die or a MY die.

The first printing fluid printing system and the second printing fluid printing system may need to be positionally calibrated to compensate for any misalignment between the two systems. In certain examples, where the first printing fluid printing system is an ink printing system and the second printing fluid printing system is a fixative printing system, the ink printing system and the fixative printing system may need to be positionally calibrated to compensate for any misalignment between the two systems. For example, assembly tolerances in the printing system may be acceptable for printing functionality but still allow for a misalignment between the fixative printing system and the ink printing system. Furthermore, wear and tear during use of the printing system may move components of the fixative printing system and the ink printing system relative to each other.

Positional calibration of the first printing fluid printing system and second printing fluid printing system allows the printing system to print the first printing fluid and second printing fluid correctly with respect to each other. Thus, with respect to the examples described above, positional calibration of the fixative printing and the ink printing systems allows the printing system to print the fixative in the correct position with respect to the printed ink so that the fixative and the image align.

Positional calibration of the first printing fluid printing system and the second printing fluid printing system may be achieved by determining the positional misalignment of the systems and then providing a relative positional correction within a controller of the printing system.

The alignment between an image printed from the first printing fluid and an image printed from the second printing fluid may be achieved by analysing a calibration target printed on a print target. With respect to the example printing fluids described above, the alignment between the fixative image and the printed ink image may be achieved by analysing a calibration target printed on a print target. The print target may be a sample of stock print media to be used in a printing process. For example, the print target may be one of a packaging stock media. For example, the print target may be a packing print medium. For example, the print target may be a flat cardboard box blank. In certain examples, the print target may be a bed of build material used in a build process for fabricating a three-dimensional object. For example, the print target may be a layer of build material deposited on a build platform of a build device. The positional calibration may be performed sporadically or before beginning each printing process on the printing system.

An imaging system may be used to capture an image of the calibration target on the print target. However, in certain examples where the second printing fluid is a fixative, the fixative may be substantially transparent so that it does not visually interfere with the printed image. Thus, in an image of the calibration target captured by the imaging system, any fixative may be difficult to identify by a computer system or be seen by the human eye.

Furthermore, in certain examples utilizing printing nozzles, some fixative delivery nozzles may fail to function meaning fixative is not deposited onto the print target. In certain example systems these malfunctions may be described as dry nozzles or missing nozzles.

Figure 1:
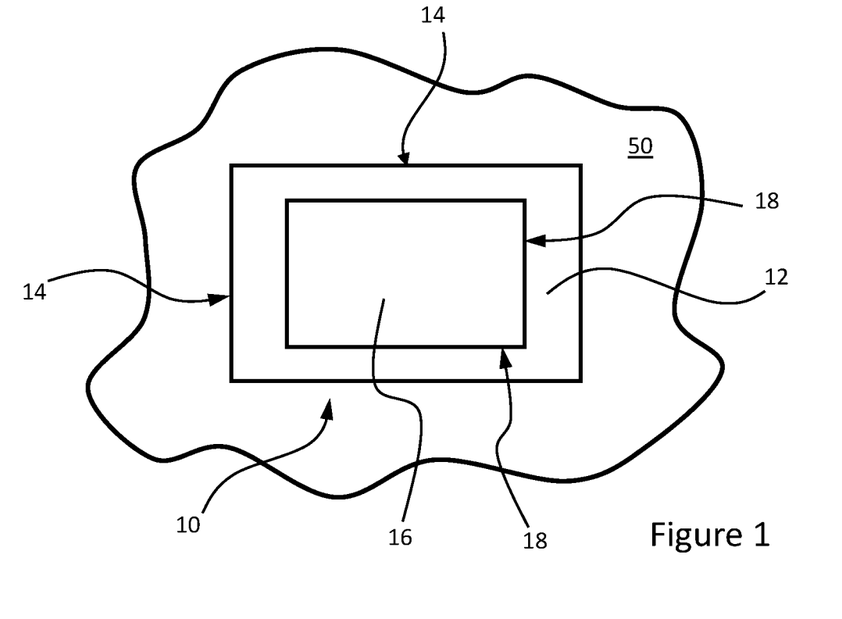
FIG. 1 is a schematic diagram of a plan view of an example calibration target printed on a print target.

A portion of the second printing fluid may be printed with a portion of the first printing fluid on a print target to produce a calibration target in which the second printing fluid portion may be identified during a positional calibration process. In certain examples, a portion of fixative may be printed with a portion of ink on a print target to produce a calibration target in which the fixative may be identified during a positional calibration process. An example calibration target 10 is schematically illustrated in FIG. 1.

The calibration target 10 may include an first printing fluid FIG. 12, which in this example is a rectangle shape, printed on a print target 50. The first printing fluid FIG. 12 may have outer borders 14 defining the rectangle. The first printing fluid FIG. 12 may be printed by the first printing fluid printing system. In certain examples, the first printing fluid FIG. 12 may be an ink FIG. 12. In certain examples, the ink FIG. 12 may be printed by the ink printing system.

The calibration target 10 may include a second printing fluid FIG. 16, which in this example is a relatively smaller rectangle shape compared to the first printing fluid FIG. 12, printed on the print target 50. The second printing fluid FIG. 16 may have outer borders 18. In certain examples, the second printing fluid FIG. 16 may a fixative FIG. 16. In certain examples, the fixative FIG. 16 may be printed by the fixative printing system.

In certain examples, the fixative FIG. 16 may be printed before the ink FIG. 12 is printed.

In examples where the first printing fluid FIG. 12 is an ink FIG. 12, the ink FIG. 12 may be printed from any ink colour. For example, the ink FIG. 12 may be printed with a subtractive colour model system. The ink FIG. 12 may be printed from any of one of, or any combination of, the colours in the CMYK (cyan, yellow, magenta, black) colour model. In one example, the ink FIG. 12 may be printed in CK (cyan, black) colours.

The printed second printing fluid FIG. 16 may be fully or partially within the external borders 16 of the first printing fluid FIG. 12. In certain situations, for example, the misalignment of the first printing fluid printing system and second printing fluid printing system may be large enough that the printed second printing fluid FIG. 16 may be partially within the external borders 16 of the first printing fluid FIG. 12.

Although in the example of FIG. 1, the first printing fluid FIG. 12 is a rectangular shape and the second printing fluid FIG. 16 is a rectangular shape, the first printing fluid FIG. 12 may be any suitable shape that allows it to be imaged and the captured image processed as described in the method below. The second printing fluid FIG. 16 may also be any suitable shape that allows it to be imaged and the captured image processed as described in the method below.

In examples where the second printing fluid comprises a fixative, the transparency of the fixative and any missing nozzles during printing can make it difficult for a computer system to identify the geometry of the example calibration target shown in FIG. 1.

When experimenting with first and second printing fluids comprising ink and fixative, the Applicant has found that, although the centre points of the ink FIG. 12 and the fixative FIG. 16 can be calculated, if the calculated centre of the fixative figure is inaccurate due to the transparency and/or missing nozzles affecting the fixative figure then the alignment of the ink printing and fixative printing systems may be correspondingly inaccurate.

Figure 2:
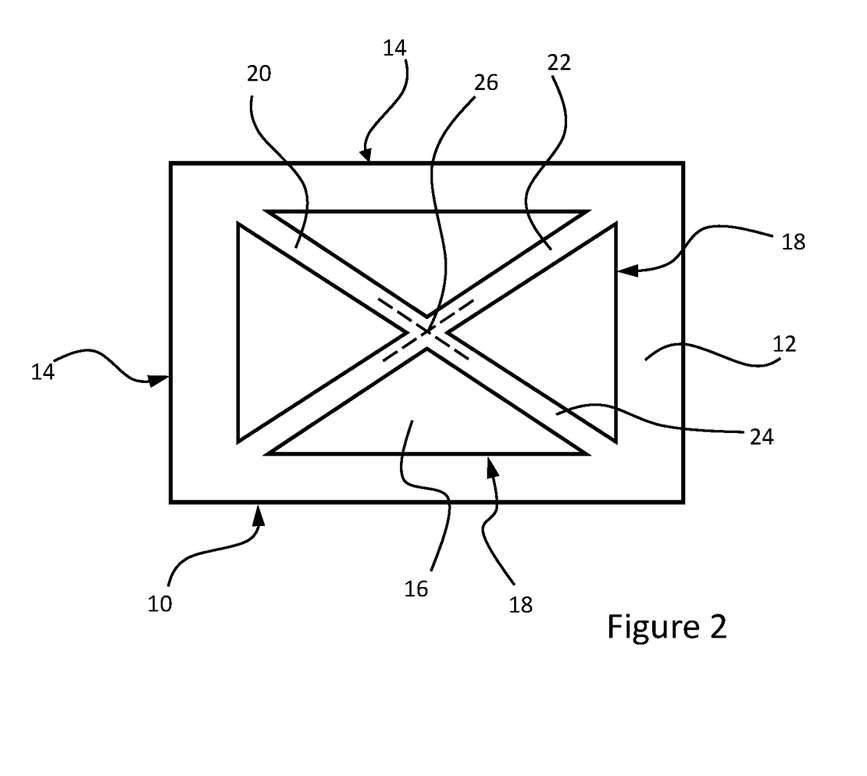
FIG. 2 is a schematic diagram of a plan view of an example calibration target printed on a print target.

Another example of a calibration target 10 is schematically illustrated in FIG. 2. In the figures, like features have been indicated by like-numbered reference signs. The print target 50 is not shown in FIG. 2.

The calibration target 10 includes a first printing fluid FIG. 12 printed on the print target 50 and a second printing fluid FIG. 16 printed on the print target 50. In certain examples, the first printing fluid may be an ink. In certain examples, the second printing fluid may be a fixative.

The first printing fluid FIG. 12 may have outer borders 14. As with the example in FIG. 1 above, the first printing fluid FIG. 12 may be printed by the first printing fluid printing system. The second printing fluid FIG. 16 may have outer borders 18. The second printing fluid FIG. 16 may be printed by the second printing fluid printing system. The second printing fluid FIG. 16 may be printed within the external borders 16 of the first printing fluid FIG. 12. The second printing fluid FIG. 16 may be partially printed within the external borders 16 of the first printing fluid FIG. 12.

In the example of FIG. 2, the first printing fluid FIG. 12 has a rectangular shape. In other examples, the first printing fluid FIG. 12 may be any suitable shape. The outer borders 18 of the second printing fluid FIG. 16 form a generally rectangular shape. The second printing fluid FIG. 16 may also be any suitable shape.

In certain examples where the first printing fluid is an ink, the first printing fluid FIG. 12 may be an ink FIG. 12 and may be printed from any ink colour. For example, the ink FIG. 12 may be printed with a subtractive colour model system. The ink FIG. 12 may be printed from any of one of, or any combination of, the colours in the CMYK (cyan, yellow, magenta, black) colour model. In an example, the ink FIG. 12 may be printed in CK (cyan, black) ink. In an example, the ink FIG. 12 may be printed in CMYK (cyan, magenta, yellow, black) ink.

The second printing fluid FIG. 16 includes a geometric FIG. 20. The geometric FIG. 20 has geometric features. The geometric FIG. 20 is negatively outlined in the second printing fluid FIG. 16. In other words, the geometric FIG. 20 may be defined by areas of the second printing fluid FIG. 16 that are printed with a lower amount of second printing fluid relative to areas of the second printing fluid FIG. 16 printed with a larger amount of second printing fluid. The areas of the second printing fluid FIG. 16 that are printed with a lower amount of second printing fluid may include areas that are printed with no second printing fluid at all.

In an example, where the second printing fluid is a fixative, to vary the amount of fixative printed in the different areas of the fixative figure, the entire area of the fixative FIG. 16 may be pre-printed with a first amount of fixative and then the area that is not part of the geometric FIG. 20 is printed with a second amount of fixative. The first amount of fixative may be smaller than the second amount of fixative.

Negatively outlined geometric features in the fixative FIG. 16 can be identified more reliably than geometric features of the fixative FIG. 16 itself since they are not as dependent on the fixative printing system print quality. Relatively thin features in the geometric FIG. 20, relative to wider areas of printed fixative, may also be reliably identified. In an example, relatively thin lines may be used to define the geometric FIG. 16.

In an example, the geometric FIG. 20 and its geometric features may be defined in a visual image. For example, the geometric FIG. 20 may be defined in graphics data such that the visual image of the geometric FIG. 20 may be viewed on a user interface of computer. The geometric FIG. 20 negatively outlined in the second printing fluid FIG. 16 may be defined in the graphics data. The print data for the second printing fluid FIG. 16 may be derived from the graphics data.

The visual image of the geometric FIG. 20 may function as a reference geometric figure having reference geometric features. For example, the graphics data may define the reference geometric figure and the reference geometric features. The reference geometric figure may be compared with the negatively printed geometric FIG. 20 to locate the geometric features of the geometric FIG. 20 during the positional calibration process.

As described below, the geometric features of the geometric FIG. 20 may be located and then matched against the reference geometric features of the reference geometric figure. Once the geometric features have been located then the position of reference points on the geometric FIG. 20, and therefore the second printing fluid FIG. 16, can be determined from their predefined relationship with the geometric features.

In the example illustrated in FIG. 2, the geometric FIG. 20 has geometric features the form of a cross. Any suitable geometric features may form the geometric FIG. 20. For example, the geometric FIG. 20 may have geometric features in the form of a circle, a rectangle, or a square. In other examples, the geometric FIG. 20 may have geometric features in the form of a triangle, a diamond shape, or a lozenge shape. In other examples, multiple lines that slant in different directions may be provided. Many suitable geometric features are conceivable.

Geometric features that define a geometric FIG. 20 with a centre symmetric geometric relationship, i.e. having mirror symmetry, may be easily located during image analysis due to their regular shape. It is also beneficial to provide geometric FIG. 20 that do not have edges along a print axis of the printing system since the negatively printed edges of such geometric features can be mistaken with second printing fluid figure edges resulting in alignment errors.

In an example, the geometric FIG. 20 may be outlined by at least one negative line defined by the second printing fluid FIG. 16. For example, the one negative line may define geometric features of a circle or an ellipse. In an example, the geometric FIG. 20 may be outlined by more than one negative line defined by the second printing fluid FIG. 16. For example, two negatively outlined lines may define the cross shaped geometric feature shown in FIG. 2. In an example, the negatively outlined lines may have different slopes such that the negatively outlined lines intersect. In an example, the negatively outlined lines may have opposing slopes, i.e. slope in opposite directions. In an example, a plurality of negatively outlined lines may define the geometric feature(s) of the geometric FIG. 20.

The geometric FIG. 20 may be within the outer borders 18 of the second printing fluid FIG. 20. Being within the outer borders 18 of the second printing fluid FIG. 20 may include the negatively outlined geometric FIG. 20 being coincident with the outer borders 18 of the second printing fluid FIG. 20. Such an example is shown in FIG. 2 where the negatively outlined lines defining the cross shape abut the borders 18 of the second printing fluid. In an example, the geometric FIG. 20 may be entirely defined within the outer borders 18 of the second printing fluid FIG. 20 such that the geometric FIG. 20 is surrounded by printed second printing fluid. For example, the circular geometric FIG. 20 shown in FIG. 3 is surrounded by printed second printing fluid.

Figure 3:
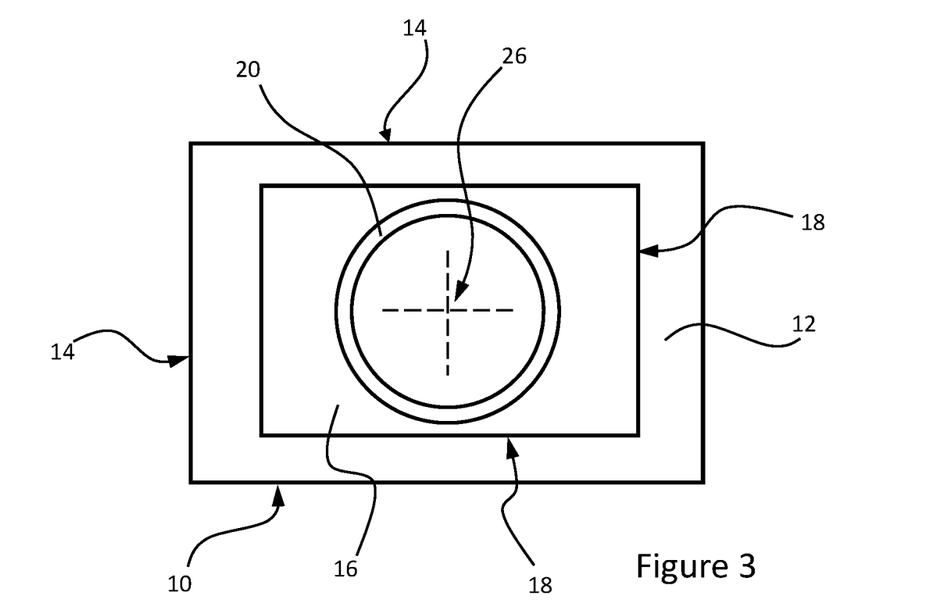
FIG. 3 is a schematic diagram of a plan view of an example calibration target printed on a print target.

With respect to the example calibration target 10 illustrated in FIG. 3, the cross shaped geometric feature is formed by two negatively printed lines 22, 24. The negatively printed lines 22, 24 may have opposing slopes. For example, the negative line 22 may a have a positive gradient with respect to the horizontal of FIG. 2 whilst the negative line 24 may have a negative gradient with respect to the horizontal.

The two negatively printed lines 22, 24 be arranged at any suitable intersection angle. In the example shown in FIG. 2, the negatively printed line 22 is arranged at approximately 30 degrees to the horizontal. In an example, the two negatively outlined lines 22, 24 be arranged perpendicular to one another.

The negatively outlined lines 22, 24 intersect to form a target point 26. The target point 26, when located in the positional calibration process described below, is a reference point that allows the position of the second printing fluid FIG. 16 to be compared with the position of the first printing fluid FIG. 12.

In certain examples, geometric features may provide a range of target points 26. For example, where the geometric feature is a circle, the centre of the circle may be the target point 26. In an example, the vertices of a diamond shaped geometric feature may be target points 26 or provide reference points that allow the calculation of a target point 26 corresponding to the centre of the diamond shaped geometric FIG. 20.

Figure 4:
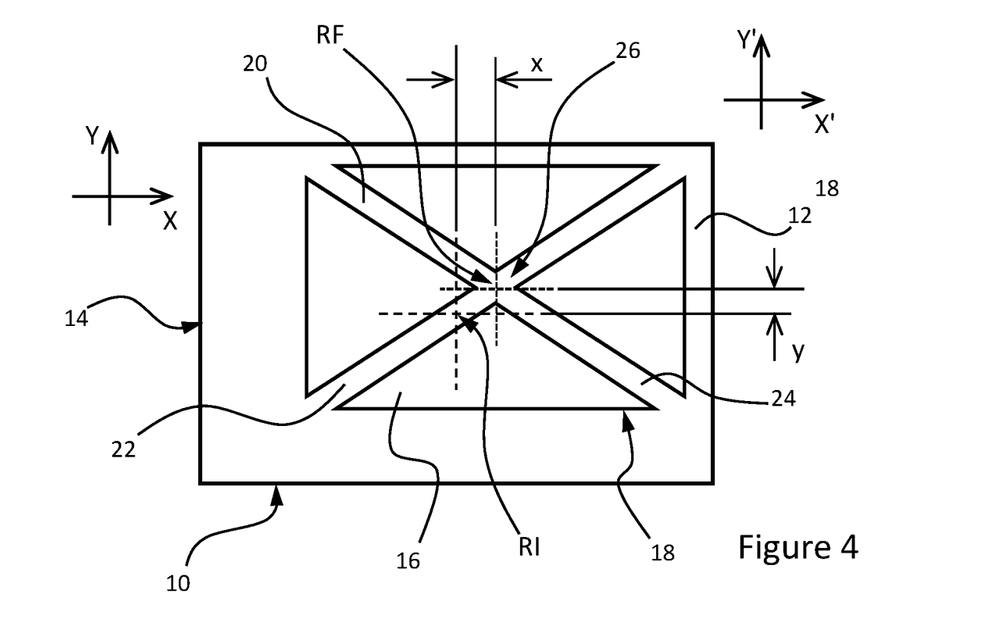
FIG. 4 is a schematic diagram of a plan view of an example calibration target printed on a print target.

An example of a calibration target is shown in FIG. 3 in which the second printing fluid FIG. 16 may negatively outline a geometric FIG. 20 that is a circle. The circle may be defined in the second printing fluid FIG. 16 by one negative outlined line. The centre of the circle may correspond with the target point 26 as shown in FIG. 4.

The calibration targets, for example any of the calibration targets 10 shown in FIGS. 1 to 4, may be printed on any print target. In certain examples, where the first printing fluid is an ink, the ink FIG. 12 of the example calibration targets may be printed on any print target from any ink colour. For example, the ink FIG. 12 may be printed on any print target from any of one of, or any combination of, the colours in the CMYK (cyan, yellow, magenta, black) colour model.

In certain examples, the calibration targets may be printed on a print target such as a coated print medium or an uncoated print medium.

A coated print medium may be a paper-based medium coated by a compound to impart certain qualities to the paper. For example, weight, surface gloss, smoothness or reduced ink absorbency. In certain examples, for coated print media and using ink as the first printing fluid, the Applicant has found that the calibration target provides good calibration results when the ink FIG. 12 is printed in CK ink. This may be due to ink not being absorbed as deeply by the coated printing medium and that this produces a more vivid ink figure. However, any in colour or combination of ink colours may be used to print the ink FIG. 12 on coated media.

In certain examples, the Applicant has found that the calibration target provides a higher contrast when printed in CMYK on uncoated print media. An uncoated print medium may be more porous and therefore absorb more ink. However, any ink colour or combination of ink colours may be used to print the example ink FIG. 12 on uncoated media.

The example calibration targets disclosed herein may be printed on any suitable print target and used in the any of the example calibration processes disclosed herein. The example calibration targets disclosed herein may be printed with any suitable first printing fluid and second printing fluid. The example calibration targets disclosed herein, when printed with ink, may be printed with any suitable inks and may be printed in any suitable ink colour or suitable combination of ink colours.

The printed calibration targets described above may be used in determining the relative positions of a first printing fluid printing system and a second printing fluid printing system. In certain examples, the printed calibration targets described above may be used in determining the relative positions of an ink printing system and a fixative printing system. An example positioning calibration process in which the relative positions of a first printing fluid printing system and a second printing fluid printing system will now be described with respect to FIG. 5. An example calibration target 10 is shown in FIG. 4. Other calibration targets may be used during the process, for example those described herein. The calibration target 10 may be printed on a print target 50 (not shown). FIG. 4 is for illustrative purposes and should not be taken as being to scale.

Figure 5:
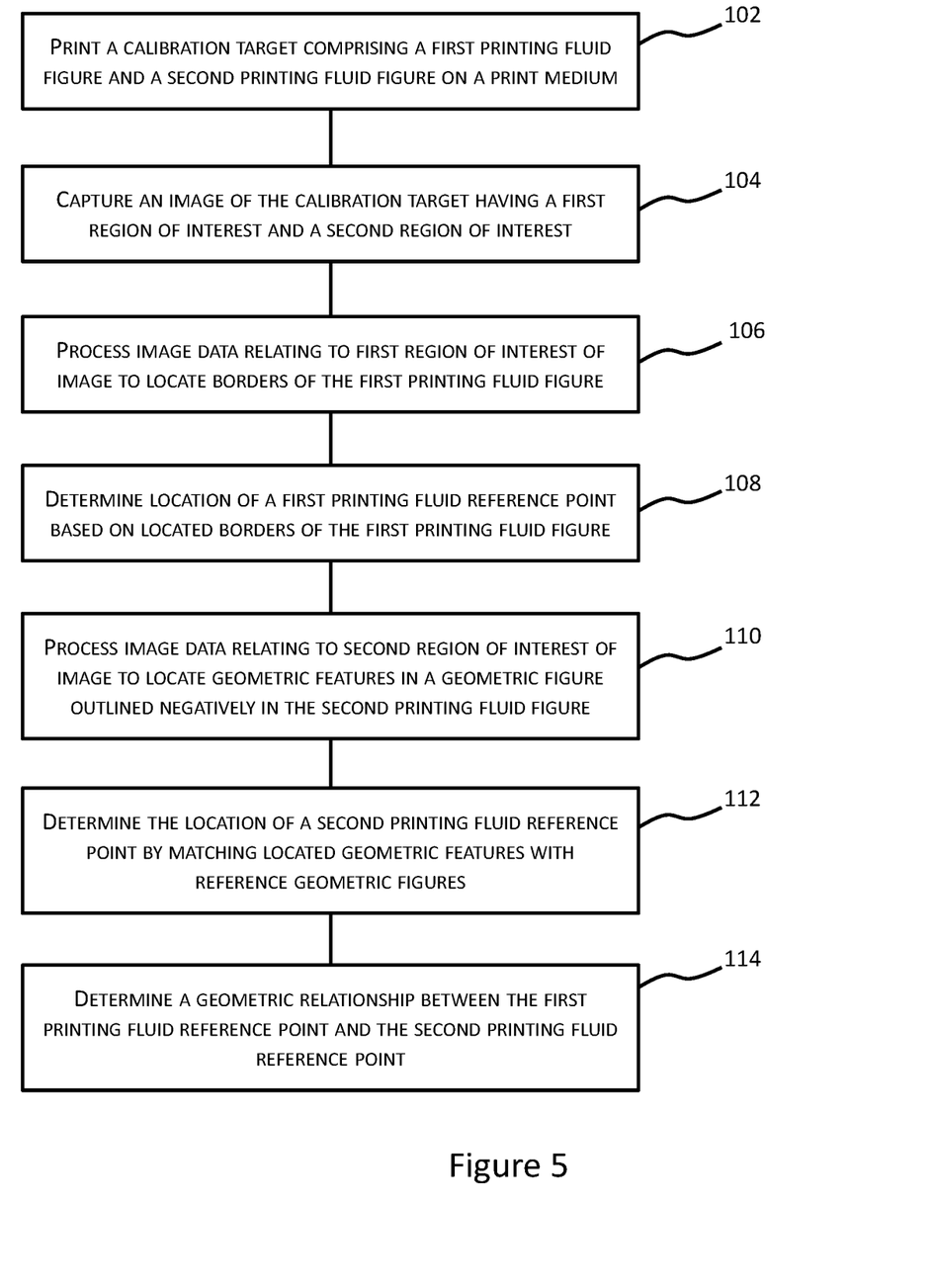
FIG. 5 is a flow chart of an example calibration process defining a geometric relationship between a first printing fluid reference point and a second printing fluid reference point.

At block 102 a calibration target may be printed on a print target. A first printing fluid figure may be printed on the print target. The first printing fluid figure may be printed with the first printing fluid printing system. The first printing fluid figure may be an ink figure. The ink figure may be printed with the ink printing system. A second printing fluid figure may be printed on the print target. The second printing fluid figure may be printed with the second printing fluid printing system. The second printing fluid figure may be a fixative figure. The fixative figure may be printed with the fixative printing system. The second printing fluid figure may define a geometric figure negatively outlined in the second printing fluid figure. The calibration target may be one of the examples described above.

The calibration target 10 may be, for example, the calibration target shown in FIG. 4. The first printing fluid figure may be the first printing fluid FIG. 12 shown in FIG. 4, for example. The first printing fluid FIG. 12 shown in FIG. 4 may be an ink figure as described above, for example. The second printing fluid figure may be the second printing fluid FIG. 16 shown in FIG. 4, for example. The second printing fluid FIG. 16 shown in FIG. 4 may be a fixative figure as described above, for example. The calibration target may comprise the first printing fluid figure and the second printing fluid figure. For example, the calibration target 10 in FIG. 4 may comprise the first printing fluid FIG. 10 and the second printing fluid FIG. 16. The geometric figure may be, for example, the geometric FIG. 20 illustrated in FIG. 4. The geometric figure may be negatively outlined in the second printing fluid figure. For example, the geometric figure may be negatively outlined in the fixative figure.

At block 104, an image of the print target may be captured. The captured image may be stored as image data on a storage medium, for example, the storage medium described below. The image may be captured by a digital imaging system for example. Capturing the image may involve capturing an image of the calibration target. For example, capturing the image may involve capturing an image of the calibration target 10 illustrated in FIG. 4. Capturing the image may involve capturing image data relating to a first region of interest of the image. The first region of interest of the image may relate to the first printing fluid figure of the calibration target. For example, capturing of a first region of interest may relate to the first printing fluid FIG. 12 of the calibration target 10 in FIG. 4. For example, the first printing fluid may be ink and capturing of a first region of interest may relate to the ink FIG. 12 of the calibration target 10 in FIG. 4. Capturing the image may involve capturing image data of a second region of interest of the image. The second region of interest of the image may relate to the second printing fluid figure of the calibration target. For example, capturing of a second region of interest may relate to the second printing fluid FIG. 16 of the calibration target 10 in FIG. 4. For example, the second printing fluid may be a fixative and capturing of a second region of interest may relate to the fixative FIG. 16 of the calibration target 10 in FIG. 4.

Capturing an image of the calibration target may be performed whilst the printing system is completing a printing process thereby allowing the positional calibration of the second printing fluid printing system relative to the first printing fluid printing system to be performed on-the-fly, which reduces set-up time of the printing system for a print run.

According to examples, the capturing of an image of the calibration target may be performed by capturing a colour image of the calibration target. In an example, the capturing of the image of the calibration target may be performed by a scanner. The scanner may be attached to the printing system. For example, the capturing of the image of the calibration target may be performed by a scanner comprising a CMOS chip. Imaging may be performed by taking an RGB (red, green, blue) colour model image of the calibration target. Where the first printing fluid is ink, capturing a colour image with an RGB imaging device provides a good quality image for all the printed ink colours. For example, each ink colour may be captured in higher quality with a different RGB channel from the other ink colours. The captured image may comprise an array of pixels defining the image.

At block 106, the image data relating to the first region of interest of the image may be processed to locate the borders of a first printing fluid figure. For example, the borders 14 of the first printing fluid FIG. 12 of FIG. 4 may be located. For example, where the first printing fluid is ink, the borders 14 of the ink FIG. 12 of FIG. 4 may be located. At block 108, the location of a first printing fluid reference point on the print target may be determined based upon the located borders of the first printing fluid figure. For example, in FIG. 4, the location of a first printing fluid reference point RI may be determined based upon the located borders 14 of the first printing fluid FIG. 12. For example, in FIG. 4, and where the first printing fluid is ink, the location of an ink reference point RI may be determined based upon the located borders 14 of the ink FIG. 12.

In certain examples, where the first printing fluid FIG. 12 is a rectangle as in FIG. 4, the relationship between the right-angle vertices of the borders may be used to determine the centre of the rectangular first printing fluid FIG. 12 which corresponds to the first printing fluid reference point RI. In an example, the centre points of the borders may be used to construct bisecting lines through the first printing fluid FIG. 12 in the processed image to determine an intersection point at which the reference point RI is located.

The first printing fluid reference point may correspond to a point in a coordinate system of the first printing fluid printing system. For example, the first printing fluid reference point RI in FIG. 4 may correspond to a point in a Cartesian coordinate system of the first printing fluid printing system. For example, and as shown in FIG. 4, the first printing fluid reference point RI may lie in the X-Y plane of a Cartesian coordinate system where the X-Y plane corresponds to, or is parallel with, a printing plane of the first printing fluid printing system, i.e. the printing surface. For example, and as shown in FIG. 4, and where the first printing fluid is ink, the ink reference point RI may lie in the X-Y plane of a Cartesian coordinate system where the X-Y plane corresponds to, or is parallel with, a printing plane of the ink printing system, i.e. the printing surface.

At block 110, the image data relating to the second region of interest of the image may be processed to locate geometric features of the geometric figure outlined negatively in the second printing fluid figure. With respect to the example in FIG. 4, the geometric features of the geometric FIG. 20 outlined negatively in the second printing fluid FIG. 16 may be located. For example, where the second printing fluid is a fixative, the geometric features of the geometric FIG. 20 outlined negatively in the fixative FIG. 16 may be located. At block 112, the location of a second printing fluid reference point on the print target may be determined by matching the located geometric features with reference geometric features from a reference geometric figure. The reference geometric features may be defined in graphics data, for example.

For example, the location of a second printing fluid reference point RF in FIG. 4 may be determined by matching the geometric features of the geometric FIG. 20 with reference geometric features from a reference geometric figure derived from the graphics data relating to the geometric FIG. 20. For example, where the second printing fluid is a fixative, the location of a fixative reference point RF in FIG. 4 may be determined by matching the geometric features of the geometric FIG. 20 with reference geometric features from a reference geometric figure derived from the graphics data relating to the geometric FIG. 20.

The second printing fluid reference point may correspond to a point in a coordinate system of the second printing fluid printing system. For example, the second printing fluid reference point RF in FIG. 4 may correspond to a point in a Cartesian coordinate system of the second printing fluid printing system. For example, and as shown in FIG. 4, the second printing fluid reference point RF may lie in X'-Y' plane of a Cartesian coordinate system where the X'-Y' plane corresponds to, or is parallel with, a printing plane of the second printing fluid printing system. For example, and as shown in FIG. 4, where the second printing fluid is a fixative, the fixative reference point RF may lie in X'-Y' plane of a Cartesian coordinate system where the X'-Y' plane corresponds to, or is parallel with, a printing plane of the fixative printing system.

In certain examples, the X'-Y' plane of the second printing fluid printing Cartesian coordinate system may be in the same plane as the X-Y plane of the first printing fluid printing Cartesian coordinate system.

At block 114, a geometric relationship between the first printing fluid reference point and the second printing fluid reference point may be determined.

For example, with respect to the calibration target 10 in FIG. 4, a geometric relationship between the first printing fluid reference point RI and the second printing fluid reference point RF may be determined. For example, with respect to the calibration target 10 in FIG. 4, and where the first printing fluid is ink and the second printing fluid is a fixative, a geometric relationship between the ink reference point RI and the fixative reference point RF may be determined. The geometric relationship may be determined in terms of distances between the first printing fluid reference point and the second printing fluid reference point. For example, the distances x and y in FIG. 4 may determine the geometric relationship between the first printing fluid reference point RI and the second printing fluid reference point RF. For example, the distances x and y in FIG. 4 may determine the geometric relationship between the ink reference point RI and the fixative reference point RF.

In certain examples, the geometric relationship may be determined in terms of distances between a point in of the coordinate system of the first printing fluid printing system and a point in the coordinate system of the second printing fluid printing system.

For example, with respect to the calibration target 10 in FIG. 4, the geometric relationship may be determined in terms of distances x and y between the second printing fluid reference point RF in the second printing fluid printing Cartesian coordinate system (the X'-Y' plane) and the first printing fluid reference point RI in the first printing fluid printing Cartesian coordinate system (the X-Y plane). For example, with respect to the calibration target 10 in FIG. 4, and where the first printing fluid is ink and the second printing fluid is a fixative, the geometric relationship may be determined in terms of distances x and y between the fixative reference point RF in the fixative printing Cartesian coordinate system (the X'-Y' plane) and the ink reference point RI in the ink printing Cartesian coordinate system (the X-Y plane).

In certain examples, either of the second printing fluid reference point RF or the first printing fluid reference point RI may be defined as the origin of a coordinate system for the printing system. In an example, the first printing fluid reference point RI may be defined as the origin of a coordinate system of the first printing fluid printing system and may be considered the default origin of the entire printing system.

The geometric relationship between the first printing fluid reference point and the second printing fluid reference point allows printed first printing fluid and printed second printing fluid to be aligned during an first printing fluid printing process and a second printing fluid printing process thereby producing a higher quality print. Furthermore, where the first printing fluid is ink and the second printing fluid is a fixative, the alignment of the ink and the fixative reduces the use of fixative since there is less fixative needed to compensate for misalignment with the printed ink. Hence, the printing system will be operated in a more efficient manner.

The positional calibration process described above may include aligning the first printing fluid printing system and/or the second printing fluid printing system. In certain examples, where the first printing fluid is ink and the second printing fluid is a fixative, the positional calibration process described above may include aligning the ink printing system and/or the fixative printing system.

In certain examples, the position of a second printing fluid image printed on a printing plane of the printing system (i.e. the printing surface) may be determined with respect to a coordinate system of the second printing fluid printing system. A printing system controller, such as the controller described below with respect to FIG. 9, may also maintain information regarding the correspondence of an origin of the second printing fluid printing coordinate system with a physical location on the printing plane of the printing system. The controller may update this information to re-locate the origin's corresponding physical location on the printing plane. Re-locating the origin may correspondingly re-locate the position of a second printing fluid image printed on the printing plane in comparison with a previously printed second printing fluid image.

Thus, in an example, to align the second printing fluid image with a corresponding first printing fluid image, the controller may update the information to re-locate the second printing fluid printing origin's corresponding physical location on the printing plane so that the first printing fluid reference point and the second printing fluid reference point are coincident. In an example, where the first printing fluid is ink and the second printing fluid is a fixative, to align the fixative image with an ink image, the controller may update the information to re-locate the fixative printing origin's corresponding physical location on the printing plane so that the ink reference point and the fixative reference point are coincident. For example, where the information regarding the correspondence of an origin of a second printing fluid printing coordinate system with a physical location on the printing plane is updated, a different set of dies may actuate to print a second printing fluid image in comparison with the dies printing the same second printing fluid image in which the calibration process had not been performed. For example, where the information regarding the correspondence of an origin of a fixative printing coordinate system with a physical location on the printing plane is updated, a different set of dies may actuate to print a fixative image in comparison with the dies printing the same fixative image in which the calibration process had not been performed.

In certain examples, the position of a first printing fluid image printed on a printing plane of the printing system may be determined with respect to a coordinate system of the first printing fluid printing system. A printing system controller, such as the controller described below with respect to FIG. 9, may also maintain information regarding the correspondence of an origin of the first printing fluid printing coordinate system with a physical location on the printing plane. The controller may update this information to re-locate the origin's corresponding physical location on the printing plane, which may correspondingly re-locate the position of a first printing fluid image printed on the printing plane.

Thus, in an example, to align the first printing fluid image with a corresponding second printing fluid image, the controller may update the information to re-locate the first printing fluid printing origin's corresponding physical location on the printing plane so that the first printing fluid reference point and the second printing fluid reference point are coincident. In an example, where the first printing fluid is ink and the second printing fluid is a fixative, to align the ink image with a corresponding fixative image, the controller may update the information to re-locate the ink printing origin's corresponding physical location on the printing plane so that the ink reference point and the fixative reference point are coincident.

Figure 6:
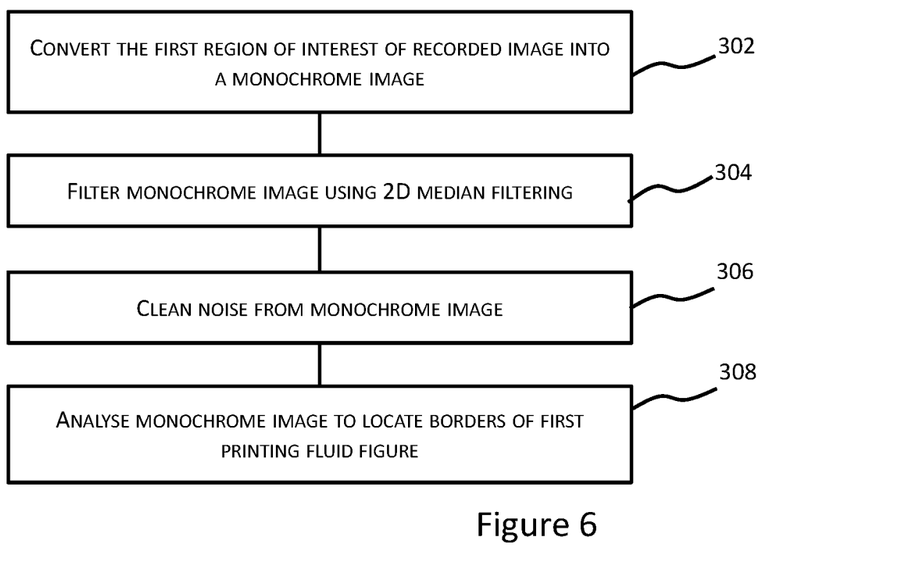
FIG. 6 is a flow chart of an example calibration process defining a geometric relationship between a first printing fluid reference point and a second printing fluid reference point.
Figure 7:
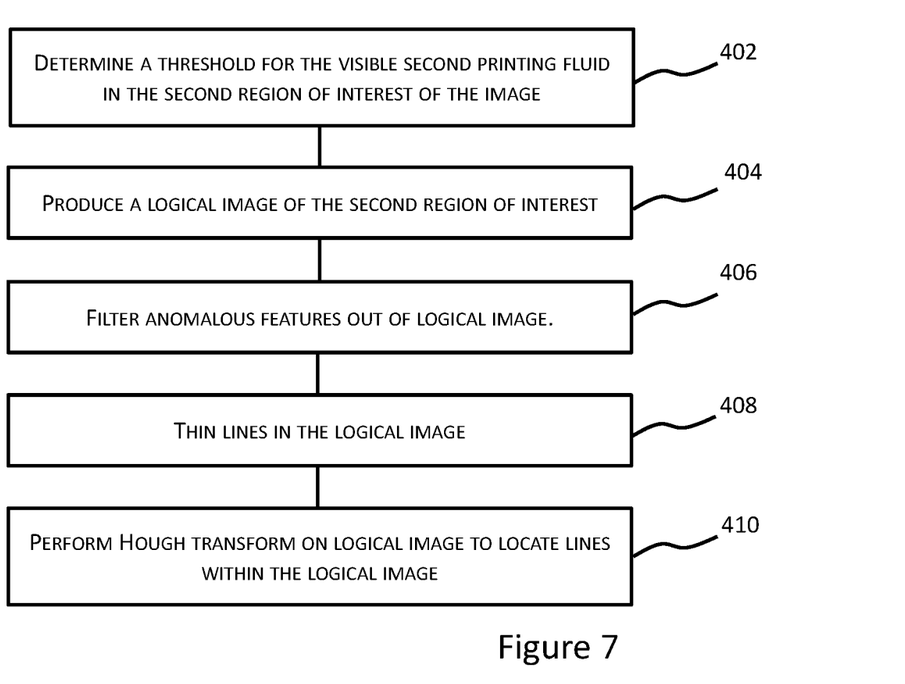
FIG. 7 is a flow chart of an example calibration process defining a geometric relationship between a first printing fluid reference point and a second printing fluid reference point.
Figure 8:
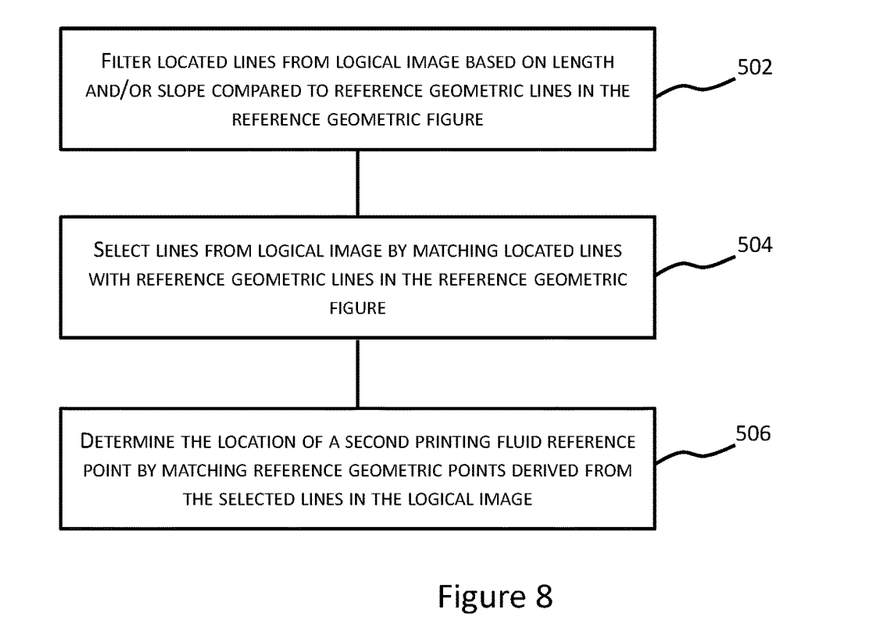
FIG. 8 is a flow chart of an example calibration process defining a geometric relationship between a first printing fluid reference point and a second printing fluid reference point.

Various additional blocks that may be performed by certain examples of the positional calibration process will now be described with respect to FIGS. 6, 7 and 8.

One example of processing the image data relating to the first region of interest of the image will now be described with respect to FIG. 6.

In an example, the first region of interest may be defined from a colour image captured as described above. In an example, the first region of interest may substantially correspond with the outline of the first printing fluid figure. For example, the first region of interest may substantially correspond with the outline of the ink figure. The outline of the ink figure may be determined by the difference in contrast between the ink and the print target.

At block 302, the processing may proceed by converting the first region of interest of the colour image to a monochrome image. For example, the monochrome image may be a greyscale image. In certain examples, at block 304, the monochrome image may be filtered using 2D median filtering. In an example, a movable window, set at 5×5 pixels for example, may scan the monochrome image and calculate the median colored pixel on a chosen colour scale, for example the grey scale. The noise from the image may then be cleaned from the image at block 306. At block 308, the edges of the first printing fluid figure may then be located by analysis of the cleaned monochrome image. For example, the borders 14 of the first printing fluid FIG. 12 of FIG. 4 may then be located by analysis of the cleaned monochrome image. For example, where the first printing fluid is ink, the borders 14 of the ink FIG. 12 of FIG. 4 may then be located by analysis of the cleaned monochrome image.

One example of processing the image data relating to the first region of interest of the image will now be described with respect to FIG. 7.

In an example, the second region of interest may be defined from the monochrome image produced at block 302. The second region of interest may substantially correspond with the outline of the second printing fluid figure. In certain examples, the second region of interest may substantially correspond with the outline of the fixative figure. In examples where the first printing fluid is ink and the second printing fluid is a fixative, the outline of the fixative figure may be determined by the contrast of the fixative with the ink colouring of the ink figure.

In certain examples, the processing of the image data relating to the second region of interest of the image may proceed at block 402 by determining a threshold shade for identifying pixels in the image that represent printed second printing fluid that is visible against the printed first printing fluid in the second region of interest of the image. For example, where the first printing fluid is ink and the second printing fluid is a fixative, the processing of the image data relating to the second region of interest of the image may proceed at block 402 by determining a threshold shade for identifying pixels in the image that represent fixative visible against the ink in the second region of interest of the image. In an example, the threshold shade may be determined through a histogram analysis of the intensity or shade of the pixels in the monochrome image. The threshold shade may be equated with a numerical threshold value based on the shade of the pixels in the image.

In an example, the darkest shaded pixels, which may, in certain examples, represent the ink figure visible in the second region of interest, may be assigned a low value with respect to the numerical threshold. The lightest shaded pixels, which may, in certain examples, represent the fixative figure visible in the second region of interest, may be assigned high value with respect to the numerical threshold. Any pixels having shades in between these extremes may be assigned an appropriate value in a range from the low value to the high value.

At block 404, a logical image may then be produced by comparing pixel shades in the second region of interest of the image with the threshold shade and assigning the pixels a binary digit based on the comparison. For example, a logical image may be produced by assigning any pixel having a value above the numerical threshold a logic value of 1 and by assigning any other pixel (i.e. equal to or below the numerical threshold) a logic value of 0 (zero). A logical image of 0s and 1s is therefore produced. For visualisation purposes, the 1s may be assigned a black colour and the 0s a white colour. The numerical threshold may therefore be used to identify darker groups of pixels (i.e. dark blobs) in the second region of interest.

Processing of the image data relating to the second region of interest of the image may then proceed at block 406 by filtering out anomalous features, for example dark groups of pixels (blobs), in the logical image that do not correspond to the shape of reference geometric features in the reference geometric figure. At block 408, the processing of the image data relating to the second region of interest of the image may also proceed by thinning any lines in the logical image. For example, any lines may be thinned to be 1 pixel in width.

At block 410, the processing of the image data relating to the second region of interest of the image may then proceed by locating of lines in the processed image. In certain examples, block 410 may also include locating lines in the logical image produced by blocks 402 to 408. In one example, at block 410, a Hough transform may be performed on the logical image to locate any lines within the image. In one example, performing a Hough transform allows all the straight lines in the processed image to be located. For example, the lines located by performing a Hough transform may include lines derived from the image data relating to the negatively outlined lines 22, 24 as shown in FIG. 4.

One example of determining the location of a second printing fluid reference point on the print target by matching the located geometric features with reference geometric features from a reference geometric figure will now be described with respect to FIG. 8. The geometric features located by processing the image data relating to the second region of interest of the image may be compared and matched with the reference geometric features. For example, the geometric features of the calibration target 10 in FIG. 4 may be matched with the reference geometric features.

In certain examples, at block 502, the lines located in the logical image (block 410) may be filtered. For example, filtering may include filtering the located lines from the logical image by comparing the length and/or slope of the located lines with reference lines in the reference geometric figure.

In an example, filtering may include the removing anomalous lines from the logical image that are longer or shorter than reference geometric lines in the reference geometric figure. With respect to the example calibration target 10 of FIG. 4, the filtering may include removing lines from the logical image that are not substantially the same length as the negative outlined lines 22, 24.

In examples, filtering may include the removing anomalous lines from the logical image that have slopes that do not match the slope of reference geometric lines in the reference geometric figure. For example, filtering may include removing lines from the logical image that have a slope that does not match one of the slopes of the negatively outlined lines 22, 24 in FIG. 4.

In certain examples, at block 504, located lines from the logical image may be selected by matching the located lines with reference geometric lines in the reference geometric figure. For example, this may include selecting the located lines that have a slope that matches a slope of a reference geometric line. In FIG. 4, for example, the selecting may include selecting lines in the logical image that have slopes matching the negatively outlined lines 22, 24 because the negatively outlined lines 22, 24 are derived from graphics data defining the respective reference geometric lines.

In certain examples, at block 506, the second printing fluid reference point may be determined by matching reference geometric points in the reference geometric figure with corresponding points derived from the selected lines in the logical image.

In certain examples, an intersection point of the selected lines may be determined and matched with the intersection point of reference geometric lines in the reference geometric figure. The intersection of the selected lines is deemed to be the position of the second printing fluid reference point. For example, the selected lines may two intersecting lines having opposing slopes that match two intersecting reference geometric lines having corresponding opposing slopes. The location of the second printing fluid reference point may be determined from the intersection point of the selected lines.

In the case of the example calibration target 10 in FIG. 4, the intersection of the selected negatively outlined lines 22, 24 may be located and deemed to be the position of the second printing fluid reference point RF.

For other example geometric figures, such as the circle shaped geometric FIG. 20 illustrated in FIG. 4, the second printing fluid reference point can be located by determining the location of the circle centre. For example, the second printing fluid reference point of FIG. 4 may be found by locating points on the circle in the second printing fluid figure and then defining the centre of the circle from a circle equation based on the points.

Several example calibration targets where tested by the Applicant using an example of the positional calibration process described above. The Applicant performed the tests using ink as a first printing fluid and a fixative as the second printing fluid. 120 example calibration targets were tested. The same fixative die and the same colour die were used during the testing. The tests showed the process reliably determined the relative positions of the ink printing system and the fixative printing system even in non-ideal printing conditions.

The distances between the fixative reference point and the ink reference point were measured. The distances were measured in the X-Y plane of a cartesian coordinate system corresponding to the printing surface of the print target. The results of the tests are shown below in Table 1.

The average precision in the X direction, Precision X ($\mu$m), and the average precision in the Y direction, Precision Y ($\mu$m), are shown in the table. Precision X was determined by averaging the results of $X_{RF}$–$X_{RI}$, where $X_{RF}$ corresponds to the X position of the fixative reference point RF and where $X_{RI}$ corresponds to the X position of the ink reference point RI as described in the examples above. Precision Y was determined by averaging the results of $Y_{RF}$–$Y_{RI}$, where $Y_{RF}$ corresponds to the Y position of the fixative reference point RF and where $Y_{RI}$ corresponds to the Y position of the ink reference point RI. The fixative reference point RF and the ink reference point RI may be as described in the examples above and as shown in the example calibration targets of FIG. 4 and FIG. 13.

Table 1 also shows the results of the tests for coated and uncoated print media. In the examples tested, the print resolution was 600 dPi corresponding to a pixel size of 42.3 µm. However, any suitable print resolution may be used with the positional calibration process described above.

TABLE 1

Precision X and Precision Y for coated and uncoated media

| | Precision X [µm] | Precision Y [µm] |
|---|---|---|
| Coated Media | 16 | 18 |
| Uncoated Media | 18 | 20 |

Figure 9:
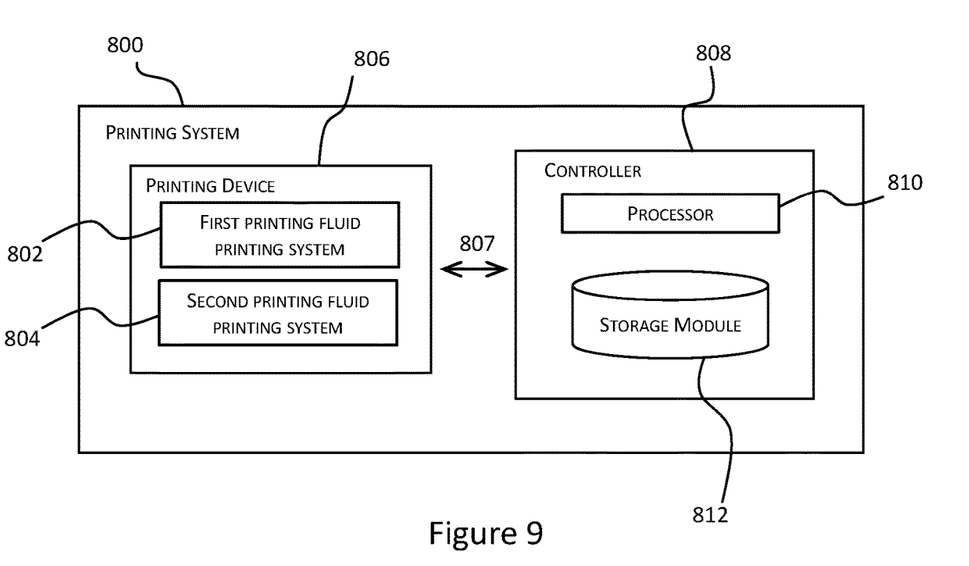
FIG. 9 is a schematic diagram of an example printing system.

The example processes described above may be performed a printing system, for example the printing system 800 shown schematically in FIG. 9. The printing system 800 may comprise a first printing fluid printing system 802 and a second printing fluid system 804. In certain examples, the first printing fluid system 802 may comprise an ink printing system. In certain examples, the second printing fluid system 804 may comprise a fixative printing system. The printing system 800 may comprise a printing device 806. The printing device 806 may comprise the first printing fluid printing system 802 and the fixative printing system 804.

The printing system 800 may comprise a printing system controller 808. The controller 808 may comprise a computer. The controller 808 may be communicatively connected 807 with the printing device 806. The controller 808 and the printing device 806 may be communicatively connected with one another via communications interfaces. For example, the controller 808 may be electrically connected to the printing device 806 by way of communication cabling. However, it will be appreciated that a wireless communication protocol may be used.

The controller 808 may be fully integrated with the printing device 806 in a single package. The controller 808 may be remote from the printed device 806. For example, the controller 808 may be remotely connected to the printed device 806 over a network, which would allow the controller 808 and the printing device 806 to be located separately from each other, including the possibility of being separate by large distances. The connection 807 may be a network connection.

The controller 808 may comprise a processor 810. The processor 810 may carry out the processes described herein or instruct they be carried out in the printing device 806. The controller 808 may comprise a storage module 812. The storage module 812 may comprise a non-transitory storage medium. The non-transitory machine-readable storage medium may be encoded with instructions executable by the processor 810. Some examples of non-transitory storage media are disks, thumb drives, memory cards and do not include propagated signals.

Any of the example calibration processes described herein may be encoded in machine readable form on the non-transitory storage medium. For example, the example calibration processes above may be in the form of a computer program comprising computer program code. For example, the non-transitory machine-readable storage medium may be encoded with instructions for performing all, or any of, the blocks described herein. For example, the processor 810 may retrieve and execute the encoded instructions and perform any of the blocks described herein or instruct another device, such as the printer device, to perform any of the blocks described herein. The processor 810 may retrieve and execute encoded instructions and perform additional blocks relating to other functions of the printing system.

The processor 810 may be a parallel processor or a serial processor. The processor 810 may execute the instructions may be carried out in any suitable order, or simultaneously.

In certain examples, the non-transitory machine-readable storage medium may be encoded with the instructions, which, when executed by a processor, control the processor to: print a calibration target on a print target comprising: printing an first printing fluid figure on the print target; and printing a fixative figure on the print target, wherein the fixative figure defines a geometric figure negatively outlined in the fixative figure; obtain image data relating to a first region of interest of an image of the calibration target and image data relating to a second region of interest of an image of the calibration target; process the image data relating to the first region of interest to locate the borders of the first printing fluid figure captured in the calibration target image; determine the location of an first printing fluid reference point based upon the detected borders of the first printing fluid figure; process the image data relating to the second region of interest to locate geometric features of the geometric figure defined by the fixative figure; determine the location of a fixative reference point on the print target by matching the located geometric features with reference geometric features from a reference geometric figure; and determine a geometric relationship between the first printing fluid reference point and the fixative reference point so that an first printing fluid printing process and a fixative printing process can be aligned during operation of a printing system.

The non-transitory machine-readable storage medium may be encoded with the other instructions relating to the functioning of the printing system.

It will be appreciated that the example blocks may be implemented at various locations throughout the printing system, for instance in the controller 808 or in the printing device 806. In addition, in some examples, the blocks may be implemented in the first printing fluid printing system 802 and/or in the fixative printing system 804. As described above, controller 808 or in the printing device 806 may be combined into a single unit and the blocks may be implemented in one location.

It will be appreciated that the example blocks may be implemented at various locations across a network. For example, a remote computer may store encoded instructions for performing an example of the calibration process described above. A local or terminal computer may access the remote computer and access the encoded instructions. It will be appreciated that the example blocks may be implemented by a dedicated circuit, for example a DSP or a programmable logic array.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A print target with a calibration target, the calibration target comprising:
   an ink figure on the print target;
   a fixative figure on the print target, wherein the fixative figure is transparent; and
   a geometric figure defined by the fixative figure, wherein the geometric figure is negatively outlined in the fixative figure, and wherein the geometric figure comprises two negatively outlined lines that have opposing slopes and intersect to form a reference point that allows a position of the ink figure to be compared with a position of the fixative figure.

2. A print target according to claim 1 wherein the geometric figure comprises geometric features that have centre symmetric geometric relationship.

3. A print target according to claim 1 wherein the print target is a coated print medium and the ink figure is printed on the coated print medium in CK ink.

4. A print target according to claim 1 wherein the print target is an uncoated print medium and the ink figure is printed on the uncoated print medium in CMYK ink.

5. The print target according to claim 1, wherein the two negatively outlined lines are perpendicular.

6. The print target according to claim 1, wherein the reference point corresponds to a point in a Cartesian coordinate system.

7. The print target according to claim 1, wherein the reference point is a fixative reference point, and wherein the fixative reference point lies in an X'-Y' plane of a cartesian coordinate system where the X'-Y' plane corresponds to a printing plane of a fixative printing system.

* * * * *